(12) United States Patent
    Shrestha et al.

(10) Patent No.: US 10,979,958 B2
(45) Date of Patent: Apr. 13, 2021

(54) SYSTEMS, METHODS, AND APPARATUSES FOR PROVIDING AND OBTAINING SCHEDULING INFORMATION FOR SIB1-BR DURING HANDOVER

(71) Applicant: APPLE INC., Cupertino, CA (US)

(72) Inventors: Bharat Shrestha, Hillsboro, OR (US); Christiane Senger, Duisburg (DE); Marta Martinez Tarradell, Hillsboro, OR (US); Debdeep Chatterjee, San Jose, CA (US); Qiaoyang Ye, Fremont, CA (US); Seau Sian Lim, Swindon (GB)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/142,115

(22) Filed: Sep. 26, 2018

(65) Prior Publication Data

US 2019/0045419 A1    Feb. 7, 2019

Related U.S. Application Data

(60) Provisional application No. 62/564,872, filed on Sep. 28, 2017.

(51) Int. Cl.
    *H04W 36/36* (2009.01)
    *H04W 36/00* (2009.01)
    *H04W 48/12* (2009.01)

(52) U.S. Cl.
    CPC ....... *H04W 36/36* (2013.01); *H04W 36/0072* (2013.01); *H04W 48/12* (2013.01)

(58) Field of Classification Search
    CPC . H04W 36/36; H04W 36/0072; H04W 48/12; H04W 74/08; H04W 76/28; H04W 36/0083; H04W 88/06; H04W 36/0069; H04W 88/10; H04W 84/12; H04W 24/08; H04W 72/04; H04W 72/0453; H04W 72/0446; H04W 72/042; H04W 74/0833; H04W 36/04; H04W 36/28; H04W 36/30; H04W 76/04; H04W 76/27; H04W 76/15; H04W 76/19; H04W 72/0413; H04B 17/318; H05K 999/99; H04L 5/0048; H04L 5/0053; H04L 5/0096; H04L 5/0073; H04L 5/00
    See application file for complete search history.

(56) References Cited

U.S. PATENT DOCUMENTS

2016/0219475 A1 *  7/2016  Kim ................. H04W 28/08
2017/0367003 A1 * 12/2017  Zhang ............ H04W 72/0453

OTHER PUBLICATIONS

ETSI TS 136331 v13.3.0 (Oct. 2016) https://www.etsi.org/deliver/etsi_ts/136300_136399/136331/13.03.00_60/ts_136331v130300p.pdf (Year: 2016).*

* cited by examiner

*Primary Examiner* — Hardikkumar D Patel
(74) *Attorney, Agent, or Firm* — Stoel Rives LLP

(57) ABSTRACT

Systems, methods, and apparatuses can provide or obtain scheduling information for a system information block type1-bandwidth reduced (SIB1-BR) without obtaining a master information block during handover. A user equipment (UE) can identify SIB1-BR scheduling information in a radio resource control connection (RRC) reconfiguration message. The UE can determine scheduling of an SIB1-BR for a target cell based on the RRC reconfiguration message, and process the SIB1-BR received from the target cell during the determined scheduling.

19 Claims, 11 Drawing Sheets

SYSTEMS, METHODS, AND APPARATUSES FOR PROVIDING AND OBTAINING SCHEDULING INFORMATION FOR SIB1-BR DURING HANDOVER

RELATED APPLICATIONS

This application is a non-provisional of U.S. Provisional Patent Application No. 62/564,872, filed Sep. 28, 2017, which is hereby incorporated by reference herein in its entirety.

TECHNICAL FIELD

This disclosure relates to wireless communication networks. Specifically, this disclosure relates to providing and obtaining system information block type1-bandwidth reduced (SIB1-BR) scheduling information during handover.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node (gNB or new radio node B (NR NB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION OF PREFERRED EMBODIMENTS

Figure 1:
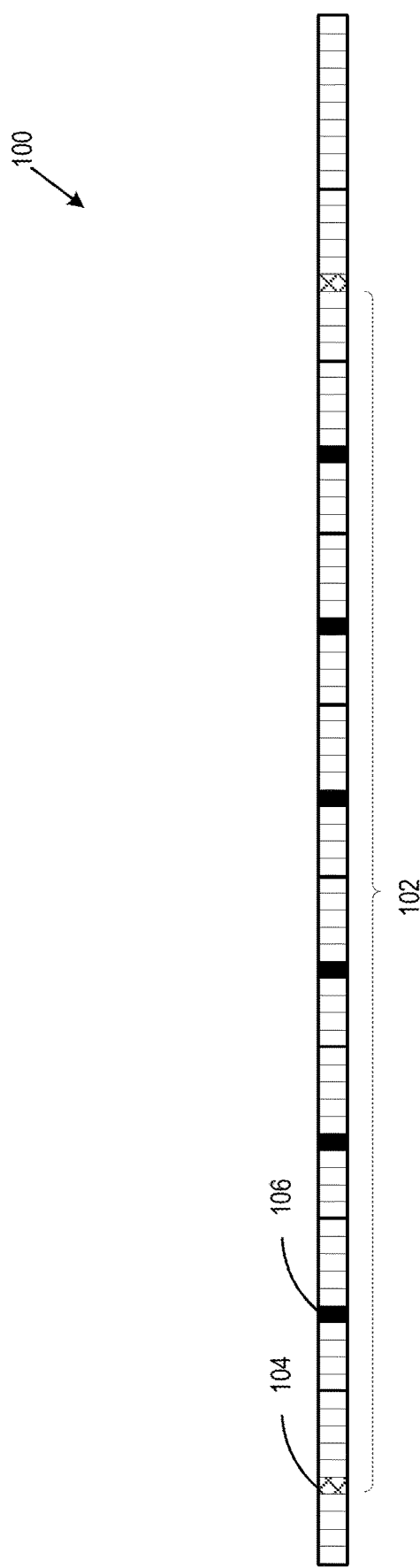
FIG. 1 shows a diagram of an SIB1-BR in the time domain, according to one embodiment.

In various applications, it is desirable for user equipment (UE) to reduce power consumption. For example, if a UE used a battery, low power consumption would benefit the battery life of the UE. Additionally, devices that are in operation for extended periods of time would be less expensive to operate. A Bandwidth reduced Low complexity (BL) user equipment (UE) and a UE in coverage enhancement (CE) represent two options for reducing power consumption of a UE.

Traditionally, a BL UE or UE in CE acquires a master information block (MIB) during handover. The purpose of acquiring the MIB by the BL UEs or UEs in CE is twofold: (1) the UE synchronizes with the target cell at system frame number (SFN) level, and (2) the UE knows the scheduling information of SIB1-BR without acquiring the SIB.

Thus using the MIB, the UE is able to synchronize with the target cell before accessing the cell, and the UE knows the scheduling of system information block type1-bandwidth reduced (SIB1-BR) in order to properly handle or avoid the collisions between the Physical Downlink Shared Channel (PDSCH) carrying the SIB1-BR and any other PDSCH/MPDCCH reception in the same subframe. For example, if PDSCH carrying SystemInformationBlockType1-BR is transmitted in one narrowband in subframe n+ki, a BL/CE UE assumes any other PDSCH in the same narrowband in the subframe n+ki is dropped. If PDSCH carrying SI message is transmitted in one narrowband in subframe n+ki, a BL/CE UE assumes any other PDSCH not carrying SystemInformationBlockType1-BR in the same narrowband in the subframe n+ki is dropped. Additionally, if SystemInformationBlockType1-BR or SI message is transmitted in one narrowband in subframe k, a BL/CE UE assumes MPDCCH in the same narrowband in the subframe k is dropped.

However, acquiring the MIB uses power, which is counter to one of the benefits of a BL UE or UE in CE. Thus, if a BL UE or UE in CE were able to synchronize at SFN level and receive SIB1-BR scheduling information without an MIB, the UE would reduce power consumption.

In some embodiments, when the source cell and target cell are synchronized at SFN level or loosely synchronized (i.e., the time difference between the source cell and target cell is less than 153600 Ts), a UE may skip acquiring the MIB so that it can save power. To indicate this state, an SFN indication may be introduced in the Mobility Control Information (mobilityControlInfo) information element (IE) in an RRC connection reconfiguration message for the handover. The BL UE and UE in CE would not be required to acquire MIB during handover when the SFN indication is included in a handover message.

This would mean that if a UE receives the same SFN indication (sameSFN-Indication) in the mobilityControlInfo message during handover, the UE is not required to acquire the MIB. However, without additional information, the UE would not have the scheduling information of the SIB1-BR if the UE skips the MIB. Therefore, only receiving the same SFN indication (sameSFN-Indication) is not sufficient to meet all the purposes of acquiring the MIB (e.g., scheduling information for the SIB1-BR).

In this disclosure, embodiments provide options on how a BL UE or UE in CE may obtain the scheduling information of SIB1-BR (schedulingInfoSIB1-BR-r13) if the UE does not acquire the MIB during handover. When a BL UE or UE in CE skips acquiring the MIB after receiving the sameSFN-Indication in mobilityControlInfo message during handover, the UE acquires the scheduling information of SIB1-BR in some other way to properly handle or avoid the collision between the receptions of PDSCH carrying SIB-BR and other PDSCH/MPDCCH. Acquiring the scheduling information of SIB1-BR can be achieved as discussed in the disclosed embodiments.

Additional details and examples are provided with reference to the figures below. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

FIG. 1 shows a diagram of an SIB1-BR 100 in the time domain, according to one embodiment. The SIB1-BR 100 can carry basic information about a cell. For example, the SIB1-BR 100 may include public land mobile network (PLMN), tracking area code, minimum receive level needed to access the cell, cell barring information, and scheduling information for other SIBs.

As shown, the SIB1-BR 100 transmits information periodically. Each period 102 includes an initial transmission 104 and repetitions 106. Scheduling information for the SIB1-BR 100 may be used by a UE to determine when to receive the SIB1-BR 100. The scheduling information may include the number of repetitions and transport block size of the PDSCH carrying SIB1-BR.

A UE may obtain scheduling information for the SIB1-BR 100 in a variety of ways. For example, a source cell may include in the mobility control information element indicators for the SIB1-BR 100 scheduling in an RRC connection reconfiguration message. The UE may decode the mobility control information element and use the SIB1-BR 100 scheduling indicators to determine timing for receiving the SIB1-BR 100.

For example, in some embodiments, the UE may assume that a target cell has the same SIB1-BR scheduling as a source cell. In these embodiments, the UE does not acquire the MIB; instead, the UE assumes the scheduling information of SIB1-BR has not changed. The network may provide an indicator to the UE to indicate that the target cell and the source cell are both the same. For example, in some embodiments, the network provides a sameSFN-Indication in the mobility control information element if the scheduling information of the SIB1-BR is the same in both the source cell and the target cell. If the sameSFN-Indication is not in the mobility control information element, the UE may obtain an MIB to obtain SIB1-BR scheduling information and SFN synchronization. Thus, the UE may reduce power consumption by not obtaining the MIB when the sameSFN-Indication is present.

In some embodiments, the UE may either handle or avoid the collision or decide to acquire the MIB if the sameSFN-Indication in mobility control information element is provided. In these embodiments, when the UE receives the mobility control information element, the UE may decode the mobility control information element and if the sameSFN-Indication is in the mobility control information element the UE obtains the MIB.

In some embodiments, a scheduling information element of SIB1-BR is provided within a mobility control information element, similarly as it is done for the sameSFN-Indication. The condition could be handover SFN synced (HO-SFNsynced) or a general handover (HO) or a new condition that may be defined.

Moreover, if other use cases are identified when SIB1-BR scheduling information is provided to RRC_CONNECTED UEs, this information may be defined instead or in addition within other information elements that allow sending them, e.g., within an RRC connection reconfiguration message, without having to include the mobility control information element.

In some embodiments the SIB1-BR scheduling may be signaled with an optional MIB repetition indication. For BL UEs or UEs in CE, MIB transmissions can be repeated in the subframe 5 of the same radio frame in time-division duplexing (TDD) and in the subframe 9 of the previous radio frame in frequency division duplexing (FDD). When a UE skips MIB acquisition, the UE would detect the PBCH transmission pattern blindly. The MIB repetition indication is also transmitted within the mobility control information element. In some embodiments, the same bit indicating MIB repetition may be used to determine scheduling of SIB1-BR. In some embodiments, the MIB repetition indication and SIB1-BR-scheduling Information can be transmitted together.

Figure 2:
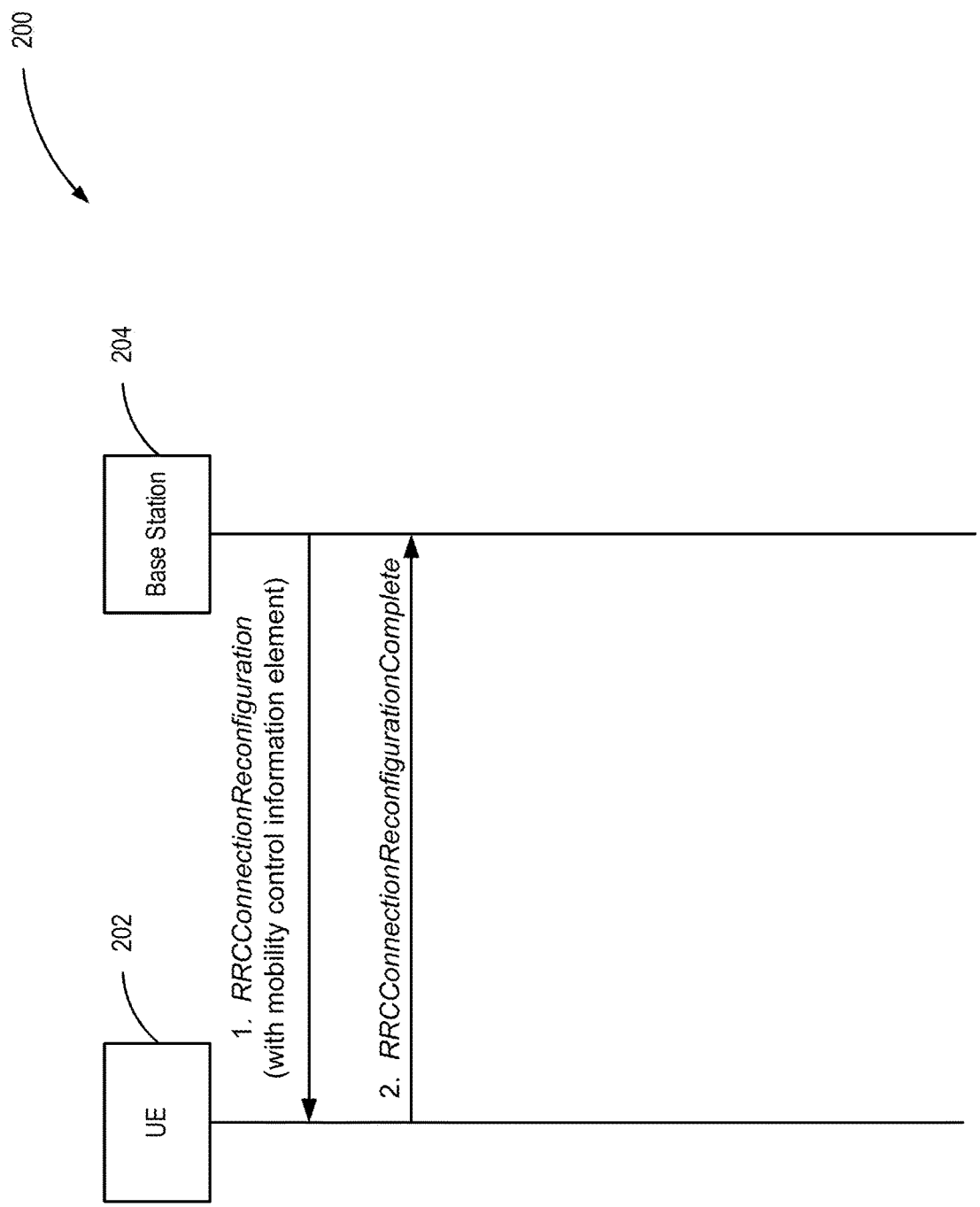
FIG. 2 is a block diagram of RRCConnectionReconfiguration message and response consistent with embodiments disclosed herein.

FIG. 2 is a block diagram of an RRCConnectionReconfiguration message and response consistent with embodiments disclosed herein. In some embodiments, the RRCConnectionReconfiguration message with mobility control information element can be signaled directly to a UE 202 by an base station 204.

The base station 204 can determine SIB1-BR scheduling for a target base station of the UE 202. The base station 204 generates an RRC connection reconfiguration message. The RRC connection reconfiguration message may include an indicator of the SIB1-BR scheduling. For example, the RRC connection reconfiguration message may comprise a mobility control information element that provides an indication of the SIB1-BR scheduling. In some embodiments, the base station 204 prepares a scheduling information field within the mobility control information element, wherein the scheduling information field indicates SIB1-BR scheduling information for a target cell.

The base station 204 may generate the mobility control information element to indicate the SIB1-BR scheduling of a target base station. In some embodiments, the base station can provide the sameSFN-Indication in the mobility control information element if the SIB1-BR is same in both the source cell and the target cell. In some embodiments, the base station can provide the sameSFN-Indication in the mobility control information element if the UE should obtain the MIB for the SIB1-BR scheduling. For example, the base station 204 may send the sameSFN-Indication if the SIB1-BR is not scheduled or the SIB1-BR of the target cell is different than the source cell.

In some embodiments, the base station 204 may generate the mobility control information element and include a scheduling information field for SIB1-BR. For example, the base station 204 may generate a mobility control info information element such as is shown below:

The fields sameSFN-Indication and schedulingInfoSIB1-BR may be defined as follows. The sameSFN-Indication field indicates that the target cell has the same SFN as the source cell and that the BL UE or UE in CE is not required to acquire MasterInformationBlock in the target PCell during handover to obtain the SFN of the target cell, as specified in section 5.3.5.4. The schedulingInfoSIB1-BR field contains an index to a table that defines System Information-BlockType1-BR scheduling information. The table is specified in TS 36.213 [23, Table 7.1.6-1 and Table 7.1.7.2.7-1]. In some embodiments, the schedulingInfoSIB1-BR field is present with an index value greater than zero if sameSFN-Indication is present.

For example, the schedulingInfoSIB1-BR may be an index value that indicates SIB1-BR scheduling as follows. The number of repetitions for PDSCH carrying SystemInformationBlockType1-BR for BL/CE UE may be indicated as illustrated in table 1 below.

TABLE 1

| Value of schedulingInfoSIB1-BR | Number of PDSCH repetitions |
| --- | --- |
| 0 | N/A |
| 1 | 4 |
| 2 | 8 |
| 3 | 16 |
| 4 | 4 |

```
-- ASN1START
MobilityControlInfo ::=          SEQUENCE {
    targetPhysCellId             PhysCellId,
    carrierFreq                  CarrierFreqEUTRA          OPTIONAL, -- Cond HO-toEUTRA2
    carrierBandwidth             CarrierBandwidthEUTRA     OPTIONAL, -- Cond HO-toEUTRA
    additionalSpectrumEmission   AdditionalSpectrumEmission   OPTIONAL, -- Cond HO-toEUTRA
    t304                         ENUMERATED {
                                    ms50, ms100, ms150, ms200, ms500, ms1000,
                                    ms2000, ms10000-v1310},
    newUE-Identity               C-RNTI,
    radioResourceConfigCommon    RadioResourceConfigCommon,
    rach-ConfigDedicated         RACH-ConfigDedicated      OPTIONAL, -- Need OP
    ...,
    [[  carrierFreq-v9e0         CarrierFreqEUTRA-v9e0     OPTIONAL  --Need ON
    ]],
    [[  drb-ContinueROHC-r11     ENUMERATED {true}         OPTIONAL  -- Cond HO
    ]],
    [[  mobilityControlInfoV2X-r14  MobilityControlInfoV2X-r14 OPTIONAL,  -- Need ON
        handoverWithoutWT-Change-r14 ENUMERATED {keepLWA-Config,
                                     sendEndMarker}        OPTIONAL, -- Cond HO
        makeBeforeBreak-r14      ENUMERATED {true}         OPTIONAL, -- Need OR
        rach-Skip-r14            RACH-Skip-r14             OPTIONAL, -- Need OR
        sameSFN-Indication-r14   ENUMERATED {true}         OPTIONAL, -- Cond HO-SFNsynced
        schedulingInfoSIB1-BR-r14 INTEGER (0..31)          OPTIONAL, -- Cond HO-SFNsynced
    ]]
```

TABLE 1-continued

| Value of schedulingInfoSIB1-BR | Number of PDSCH repetitions |
|---|---|
| 5 | 8 |
| 6 | 16 |
| 7 | 4 |
| 8 | 8 |
| 9 | 16 |
| 10 | 4 |
| 11 | 8 |
| 12 | 16 |
| 13 | 4 |
| 14 | 8 |
| 15 | 16 |
| 16 | 4 |
| 17 | 8 |
| 18 | 16 |
| 19-31 | Reserved |

In some embodiments, transport blocks mapped for BL/CE UEs SystemInformationBlockType1-BR may be indicated by the index value as given by the $I_{TBS}$ entry of Table 2.

TABLE 2

Transport block size (TBS) table for PDSCH carrying SystemInformationBlockType1-BR

| $I_{TBS}$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TBS | N/A | 208 | 208 | 208 | 256 | 256 | 256 | 328 | 328 | 328 | 504 | 504 | 504 | 712 | 712 | 712 |
| $I_{TBS}$ | 16 | 17 | 18 | 19 | 20 | 21 | 22 | 23 | 24 | 25 | 26 | 27 | 28 | 29 | 30 | 31 |
| TBS | 936 | 936 | 936 | | | | | | | Reserved | | | | | | |

In some embodiments, the base station 204 provides an offset to the scheduling information of the SIB1-BR of the source cell. In one example, the offset value of zero indicates that the scheduling information in the target cell is same.

In some embodiments, the base station 204 can include an indication bit whether or not the scheduling information of SIB1-BR is the same as shown below:

```
[[ mobilityControlInfoV2X-r14  MobilityControlInfoV2X-r14   OPTIONAL,  -- Need
ON
     handoverWithoutWT-Change-r14 ENUMERATED {keepLWA-Config,
         sendEndMarker}                          OPTIONAL, -
- Cond HO
     makeBeforeBreak-r14         ENUMERATED {true}   OPTIONAL, -- Need
OR
     rach-Skip-r14               RACH-Skip-r14       OPTIONAL, -- Need
OR
     sameSFN-Indication-r14      ENUMERATED {true}   OPTIONAL, -- Cond
HO-SFNsynced
     same-SchedulingInfoSIB1-BR  ENUMERATED {true}   OPTIONAL, -- Cond
HO-SFNsynced
     ]]
```

The fields sameSFN-Indication and same-schedulingInfoSIB1-BR may be defined as follows. The sameSFN-Indication field indicates that the target cell has the same SFN as the source cell and that the BL UE or UE in CE is not required to acquire MasterInformationBlock in the target PCell during handover to obtain the SFN of the target cell, as specified in section 5.3.5.4. The same-SchedulingInfo-SIB1-BR field indicates that the target cell has the same scheduling of the SIB1-BR as that of the source cell for the BL UE or UE in CE.

In some embodiments the SIB1-BR scheduling may be signaled with an optional MIB repetition indication. For BL UEs or UEs in CE, MIB transmissions can be repeated in the subframe 5 of the same radio frame in time-division duplexing (TDD) and in the subframe 9 of the previous radio frame in frequency division duplexing (FDD). When a UE skips MIB acquisition, the UE would detect the PBCH transmission pattern blindly. The MIB repetition indication is also transmitted within the mobility control information element.

For example, in some embodiments, a common indication bit for both MIB repetition indication and change indication for scheduling information of SIB1-BR is provided in the MobilityControlInfo information element. If the indication bit is set, MIB repetition is enabled and scheduling information of SIB1-BR has not changed in the target cells.

In another option, the MIB repetition indication and schedulingInfoSIB1-BR can be transmitted together. In one example, pbch-Repetition-Indication is defined as shown below:
pbch-Repetition-Indication ENUMERATED {MIB-SIB1-BR, noMIB-SIB1-BR, MIB-noSIB1-BR, noMIB-no-SIB1-BR}, The pbch-Repetition-Indication field indicates whether MIB repetition is enabled or not and/or whether the scheduling information of the SIB1-BR in the target cell is the same or not. MIB-SIB1-BR indicates that the MIB repetition is enabled and the schedule information of SIB1-BR is the same. Similarly MIB-noSIB1-BR indicates that the MIB repetition is enabled and the scheduling information of SIB1-BR is not the same and so on. If the scheduling information of SIB1-BR is not the same in the target cell, UE may acquire the MIB in the target cell.

The base station 204 sends the UE 202 the RRCConnectionReconfiguration message that includes the mobility control information element that indicates the SIB1-BR scheduling. The UE 202 can acknowledge the message with a RRCConnectionReconfigurationComplete message.

The UE 202 may decode RRCConnectionReconfiguration, and identify the indication of SIB1-BR scheduling. For example, the UE 202 may decode the mobility control information element and identify a scheduling information field in the RRC connection reconfiguration message that indicates SIB1-BR scheduling information for a target cell. The UE 202 may determine scheduling of an SIB1-BR for the target cell based on the scheduling information field, and configure itself to receive a PDSCH from the target cell carrying an SIB1-BR based on the SIB1-BR scheduling information. The UE 202 may receive and process an SIB1-BR received from the target cell during the determined scheduling.

Figure 3:
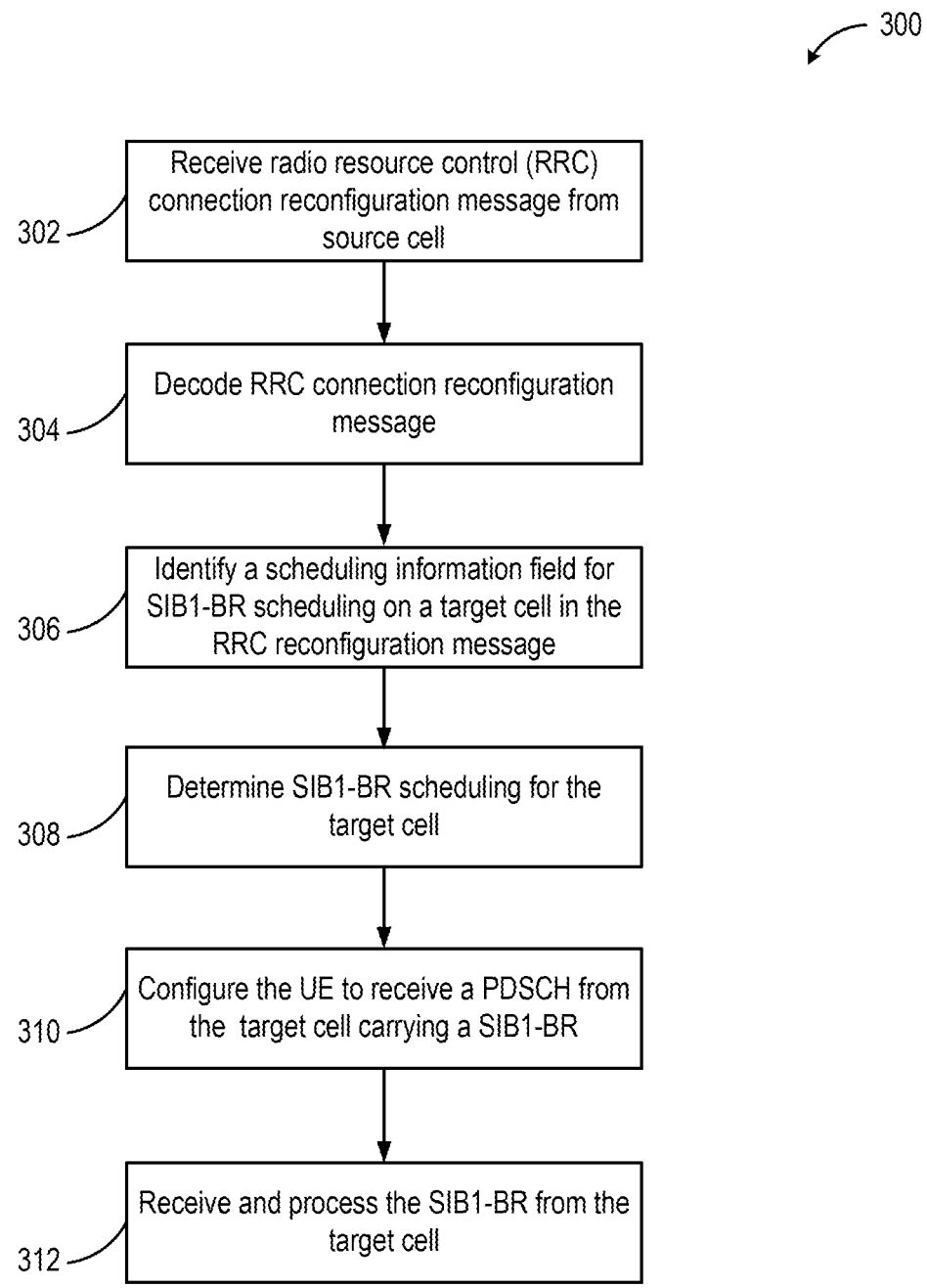
FIG. 3 is a flow chart illustrating a method for determining scheduling of an SIB1-BR for a target cell without obtaining an MIB, according to one embodiment.

FIG. 3 is a flow chart illustrating a method 300 for determining scheduling of an SIB1-BR for a target cell without obtaining an MIB. In the illustrated embodiment, a UE receives 302 an RRC connection reconfiguration message from a source cell. The UE decodes 304 the RRC connection reconfiguration message and identifies 306 a scheduling information field in the RRC connection reconfiguration message that indicates SIB1-BR scheduling information for a target cell.

In some embodiments, the scheduling information field is provided within a mobility control information element. In some embodiments, the scheduling information field comprises an index to a table that defines SIB1-BR scheduling. For example, the UE may determine an index value associated with a scheduling information system information block type1-bandwidth reduced variable (schedulingInfo-SIB1-BR) within the RRC connection reconfiguration message. In some embodiments, the index value may range between 0 and 31. In some embodiments, the table defines resource allocation for the SIB1-BR from the target cell. In some embodiments, the index value indicates whether SIB1-BR scheduling information for the target cell is different from a source cell.

The UE determines 308 scheduling of the SIB1-BR for the target cell based on the RRC connection reconfiguration message. For example, the UE may use the scheduling information field to identify SIB1-BR scheduling information for the target cell using an index value and an SIB1-BR scheduling table.

In the illustrated embodiment, the UE configures 310 the UE to receive a PDSCH from the target cell carrying an SIB1-BR based on the SIB1-BR scheduling information. The UE may receive and process 312 the SIB1-BR from the target cell during the determined scheduling. The scheduling inflation may assist the UE in handling collisions between the PDSCH carrying the SIB1-BR and another PDSCH.

Figure 4:
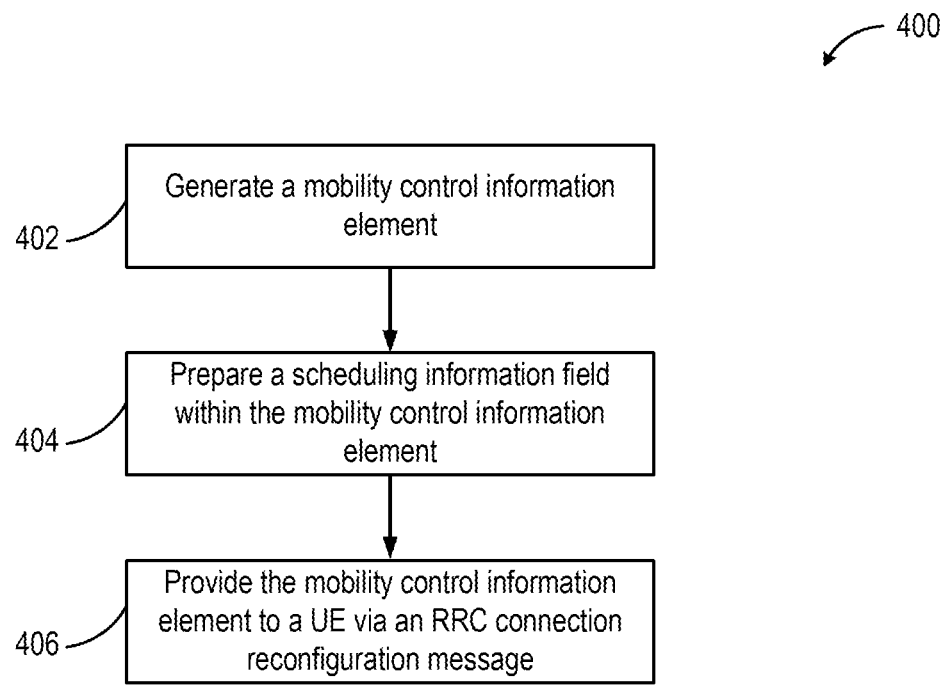
FIG. 4 is a flow chart illustrating a method for a base station to provide an RRC connection reconfiguration message comprising SIB1-BR scheduling information to a UE, according to one embodiment.

FIG. 4 is a flow chart illustrating a method 400 for an base station to provide an RRC connection reconfiguration message comprising SIB1-BR scheduling information to a UE. In the illustrated embodiment, the base station generates 402 a mobility control information element for an RRC connection reconfiguration message. The base station may prepare 404 a scheduling information field within the mobility control information element. The scheduling information field indicates SIB1-BR scheduling information for a target cell. For example, to prepare 404 the scheduling information field the base station can insert some variable (e.g., integer, value, or character) into a scheduling information field within the mobility control information element to indicate system information block type1-bandwidth reduced (SIB1-BR) scheduling information for a target cell In some embodiments, the scheduling information field comprises an index to a table that defines the SIB1-BR scheduling. The base station provides 406 the mobility control information element with the scheduling information field to a user equipment (UE) via the RRC connection reconfiguration message.

The figures below illustrate details regarding various devices (for example, access nodes and UEs) that may be configured to generate or use scheduling information of SIB1-BR for skipping MIB during handover.

Figure 5:
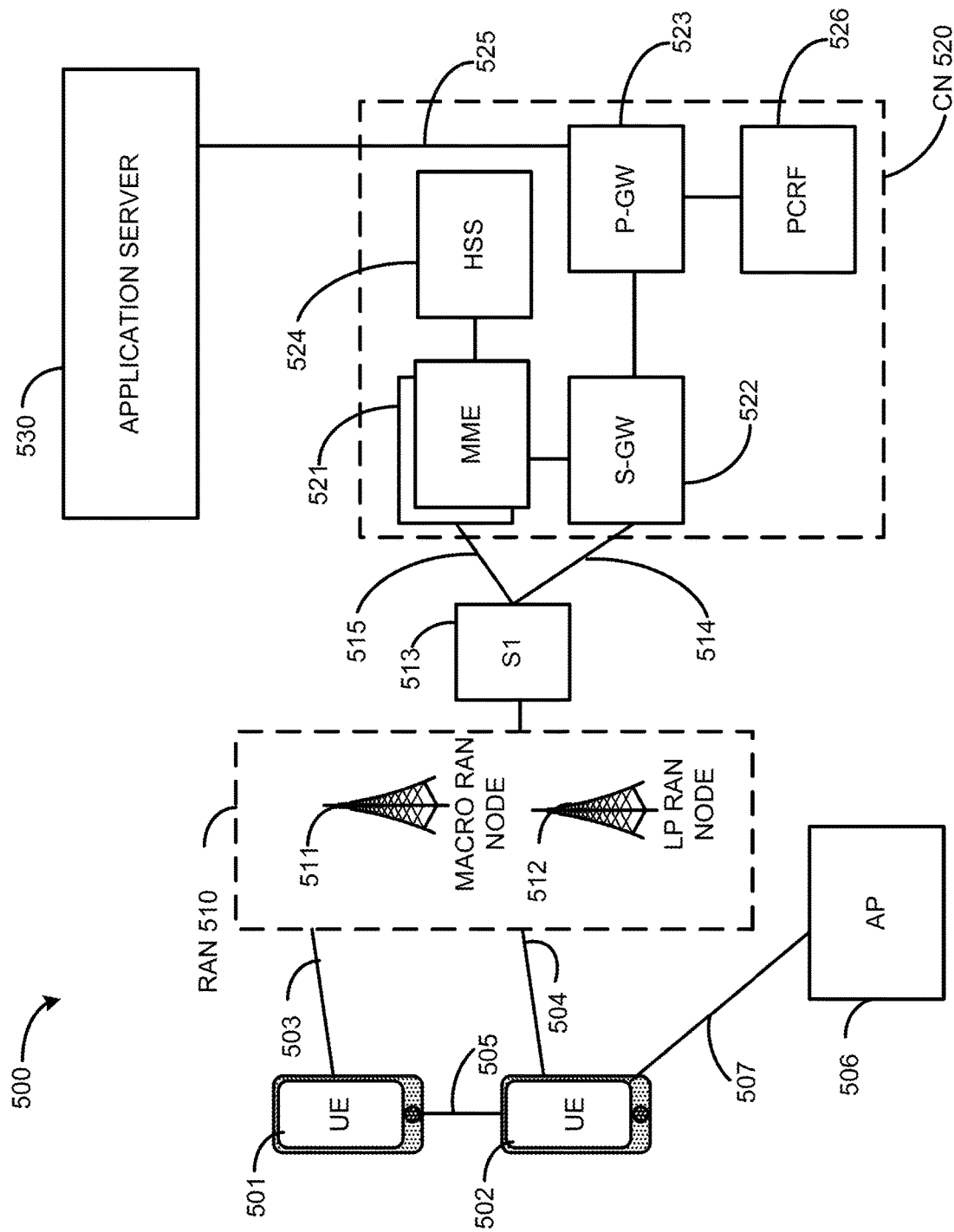
FIG. 5 illustrates an architecture of a system of a network in accordance with some embodiments.

FIG. 5 illustrates an architecture of a system 500 of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510. The RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 may be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment the S1 interface 513 is split into two parts: the S1-U interface 514, which carries traffic data between the RAN nodes 511 and 512 and a serving gateway (S-GW) 522, and an S1-mobility management entity (MME) interface 515, which is a signaling interface between the RAN nodes 511 and 512 and MMEs 521.

In this embodiment, the CN 520 comprises the MMEs 521, the S-GW 522, a Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the CN 520 (e.g., an EPC network) and external networks such as a network including the application server 530 (alternatively referred to as application function (AF)) via an Internet Protocol (IP) interface 525. Generally, an application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. A Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
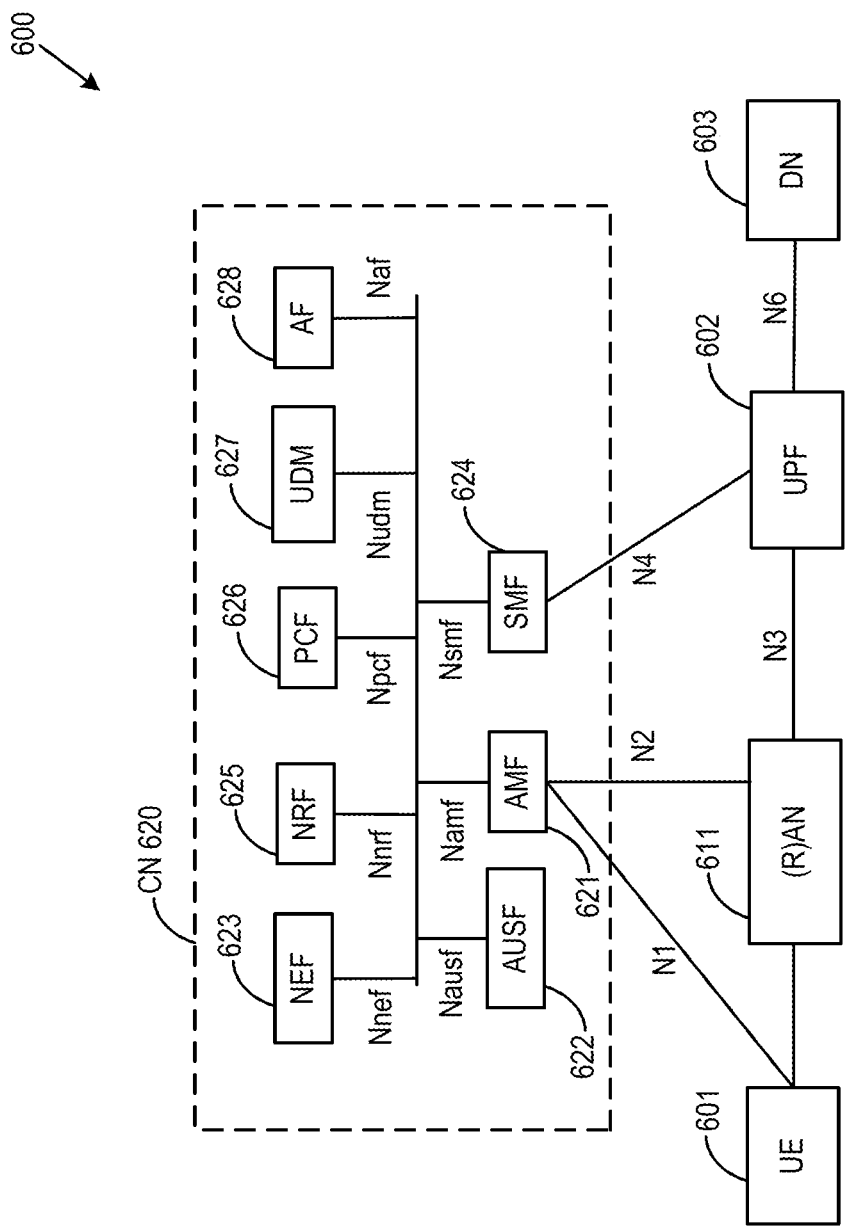
FIG. 6 illustrates an architecture of a system of a network in accordance with some embodiments.

FIG. 6 illustrates an architecture of a system 600 of a network in accordance with some embodiments. The system 600 is shown to include a UE 601, which may be the same or similar to UEs XXS01 and XXS02 discussed previously; a RAN node 611, which may be the same or similar to RAN nodes XXS11 and XXS12 discussed previously; a User Plane Function (UPF) 602; a Data network (DN) 603, which may be, for example, operator services, Internet access or 3rd party services; and a 5G Core Network (5GC or CN) 620.

The CN 620 may include an Authentication Server Function (AUSF) 622; a Core Access and Mobility Management Function (AMF) 621; a Session Management Function (SMF) 624; a Network Exposure Function (NEF) 623; a Policy Control Function (PCF) 626; a Network Function (NF) Repository Function (NRF) 625; a Unified Data Management (UDM) 627; and an Application Function (AF) 628. The CN 620 may also include other elements that are not shown, such as a Structured Data Storage network function (SDSF), an Unstructured Data Storage network function (UDSF), and the like.

The UPF 602 may act as an anchor point for intra-RAT and inter-RAT mobility, an external PDU session point of interconnect to DN 603, and a branching point to support multi-homed PDU session. The UPF 602 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 602 may include an uplink classifier to support routing traffic flows to a data network. The DN 603 may represent various network operator services, Internet access, or third party services. NY 603 may include, or be similar to application server XXS30 discussed previously.

The AUSF 622 may store data for authentication of UE 601 and handle authentication related functionality. The AUSF 622 may facilitate a common authentication framework for various access types.

The AMF 621 may be responsible for registration management (e.g., for registering UE 601, etc.), connection management, reachability management, mobility management, and lawful interception of AMF-related events, and access authentication and authorization. AMF 621 may provide transport for SM messages between and SMF 624, and act as a transparent proxy for routing SM messages. AMF 621 may also provide transport for short message service (SMS) messages between UE 601 and an SMS function (SMSF) (not shown by FIG. 6). AMF 621 may act as Security Anchor Function (SEA), which may include interaction with the AUSF 622 and the UE 601, receipt of an intermediate key that was established as a result of the UE 601 authentication process. Where USIM based authentication is used, the AMF 621 may retrieve the security material from the AUSF 622. AMF 621 may also include a Security Context Management (SCM) function, which receives a key from the SEA that it uses to derive access-network specific keys. Furthermore, AMF 621 may be a termination point of RAN CP interface (N2 reference point), a termination point of NAS (NI) signaling, and perform NAS ciphering and integrity protection.

AMF 621 may also support NAS signaling with a UE 601 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (NI) signaling between the UE 601 and AMF 621, and relay uplink and downlink user-plane packets between the UE 601 and UPF 602. The N3IWF also provides mechanisms for IPsec tunnel establishment with the UE 601.

The SMF 624 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 624 may include the following roaming functionality: handle local enforcement to apply QoS SLAs (VPLMN); charging data collection and charging interface (VPLMN); lawful intercept (in VPLMN for SM events and interface to LI System); support for interaction with external DN for transport of signaling for PDU session authorization/authentication by external DN.

The NEF 623 may provide means for securely exposing the services and capabilities provided by 3GPP network functions for third party, internal exposure/re-exposure, Application Functions (e.g., AF 628), edge computing or fog computing systems, etc. In such embodiments, the NEF 623 may authenticate, authorize, and/or throttle the AFs. NEF 623 may also translate information exchanged with the AF 628 and information exchanged with internal network functions. For example, the NEF 623 may translate between an AF-Service-Identifier and an internal 5GC information. NEF 623 may also receive information from other network functions (NFs) based on exposed capabilities of other network functions. This information may be stored at the NEF 623 as structured data, or at a data storage NF using a standardized interfaces. The stored information can then be re-exposed by the NEF 623 to other NFs and AFs, and/or used for other purposes such as analytics.

The NRF 625 may support service discovery functions, receive NF Discovery Requests from NF instances, and provide the information of the discovered NF instances to the NF instances. NRF 625 also maintains information of available NF instances and their supported services.

The PCF 626 may provide policy rules to control plane function(s) to enforce them, and may also support unified policy framework to govern network behavior. The PCF 626 may also implement a front end (FE) to access subscription information relevant for policy decisions in a UDR of UDM 627.

The UDM 627 may handle subscription-related information to support the network entities' handling of communication sessions, and may store subscription data of UE 601. The UDM 627 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 626. UDM 627 may also support SMS management, wherein an SMS-FE implements the similar application logic as discussed previously.

The AF 628 may provide application influence on traffic routing, access to the Network Capability Exposure (NCE), and interact with the policy framework for policy control. The NCE may be a mechanism that allows the 5GC and AF 628 to provide information to each other via NEF 623, which may be used for edge computing implementations. In such implementations, the network operator and third party services may be hosted close to the UE 601 access point of attachment to achieve an efficient service delivery through the reduced end-to-end latency and load on the transport network. For edge computing implementations, the 5GC may select a UPF 602 close to the UE 601 and execute traffic steering from the UPF 602 to DN 603 via the N6 interface. This may be based on the UE subscription data, UE location, and information provided by the AF 628. In this way, the AF 628 may influence UPF (re)selection and traffic routing. Based on operator deployment, when AF 628 is considered to be a trusted entity, the network operator may permit AF 628 to interact directly with relevant NFs.

As discussed previously, the CN 620 may include an SMSF, which may be responsible for SMS subscription checking and verification, and relaying SM messages to/from the UE 601 to/from other entities, such as an SMS-GMSC/IWMSC/SMS-router. The SMS may also interact with AMF 621 and UDM 627 for notification procedure that the UE 601 is available for SMS transfer (e.g., set a UE not reachable flag, and notifying UDM 627 when UE 601 is available for SMS).

The system 600 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 600 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 620 may include an Nx interface, which is an inter-CN interface between the MME (e.g., MME XXS21) and the AMF 621 in order to enable interworking between CN 620 and CN XXS20.

Although not shown by FIG. 6, system 600 may include multiple RAN nodes 611 wherein an Xn interface is defined between two or more RAN nodes 611 (e.g., gNBs and the like) that connecting to 5GC 620, between a RAN node 611 (e.g., gNB) connecting to 5GC 620 and an eNB (e.g., a RAN node XXS11 of FIG. XXS), and/or between two eNBs connecting to 5GC 620.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 601 in a connected mode (e.g., CM-CONNECTED) including functionality to manage the UE mobility for connected mode between one or more RAN nodes 611. The mobility support may include context transfer from an old (source) serving RAN node 611 to new (target) serving RAN node 611; and control of user plane tunnels between old (source) serving RAN node 611 to new (target) serving RAN node 611.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 7:
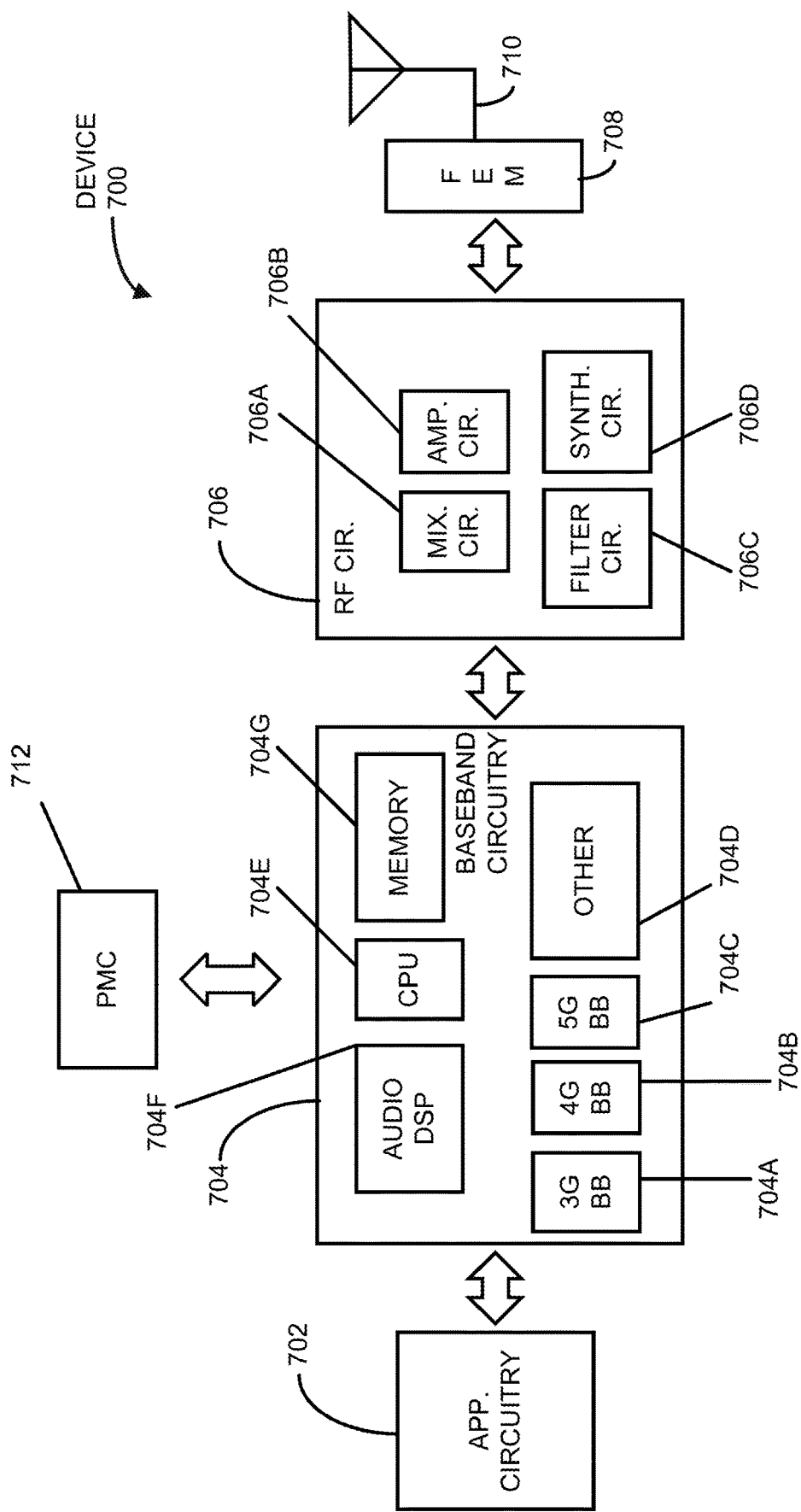
FIG. 7 illustrates example components of a device in accordance with some embodiments.

FIG. 7 illustrates example components of a device 700 in accordance with some embodiments. In some embodiments, the device 700 may include application circuitry 702, baseband circuitry 704, Radio Frequency (RF) circuitry 706, front-end module (FEM) circuitry 708, one or more antennas 710, and power management circuitry (PMC) 712 coupled together at least as shown. The components of the illustrated device 700 may be included in a UE or a RAN node. In some embodiments, the device 700 may include fewer elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 704 may include a third generation (3G) baseband processor 704A, a fourth generation (4G) baseband processor 704B, a fifth generation (5G) baseband processor 704C, or other baseband processor(s) 704D for other existing generations, generations in development or to be developed in the future (e.g., second generation (2G), sixth generation (6G), etc.). The baseband circuitry 704 (e.g., one or more of baseband processors 704A-D) may handle or avoid various radio control functions that enable communication with one or more radio networks via the RF circuitry 706. In other embodiments, some or all of the functionality of baseband processors 704A-D may be included in modules stored in the memory 704G and executed via a Central Processing Unit (CPU) 704E. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include one or more audio digital signal processor(s) (DSP) 704F. The audio DSP(s) 704F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. The RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the receive signal path of the RF circuitry 706 may include mixer circuitry 706A, amplifier circuitry 706B and filter circuitry 706C. In some embodiments, the transmit signal path of the RF circuitry 706 may include filter circuitry 706C and mixer circuitry 706A. RF circuitry 706 may also include synthesizer circuitry 706D for synthesizing a frequency for use by the mixer circuitry 706A of the receive signal path and the transmit signal path. In some embodiments, the mixer circuitry 706A of the receive signal path may be configured to down-convert RF signals received from the FEM circuitry 708 based on the synthesized frequency provided by synthesizer circuitry 706D. The amplifier circuitry 706B may be configured to amplify the down-converted signals and the filter circuitry 706C may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, the mixer circuitry 706A of the receive signal path may comprise passive mixers, although the scope of the embodiments is not limited in this respect.

In some embodiments, the mixer circuitry 706A of the transmit signal path may be configured to up-convert input baseband signals based on the synthesized frequency provided by the synthesizer circuitry 706D to generate RF output signals for the FEM circuitry 708. The baseband signals may be provided by the baseband circuitry 704 and may be filtered by the filter circuitry 706C.

In some embodiments, the mixer circuitry 706A of the receive signal path and the mixer circuitry 706A of the transmit signal path may include two or more mixers and may be arranged for quadrature downconversion and upconversion, respectively. In some embodiments, the mixer circuitry 706A of the receive signal path and the mixer circuitry 706A of the transmit signal path may include two or more mixers and may be arranged for image rejection (e.g., Hartley image rejection). In some embodiments, the mixer circuitry 706A of the receive signal path and the mixer circuitry 706A may be arranged for direct downconversion and direct upconversion, respectively. In some embodiments, the mixer circuitry 706A of the receive signal path and the mixer circuitry 706A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706D may be a fractional-N synthesizer or a fractional N/N+1 synthesizer, although the scope of the embodiments is not limited in this respect as other types of frequency synthesizers may be suitable. For example, synthesizer circuitry 706D may be a delta-sigma synthesizer, a frequency multiplier, or a synthesizer comprising a phase-locked loop with a frequency divider.

The synthesizer circuitry 706D may be configured to synthesize an output frequency for use by the mixer circuitry 706A of the RF circuitry 706 based on a frequency input and a divider control input. In some embodiments, the synthesizer circuitry 706D may be a fractional N/N+1 synthesizer.

In some embodiments, frequency input may be provided by a voltage controlled oscillator (VCO), although that is not a requirement. Divider control input may be provided by either the baseband circuitry 704 or the application circuitry 702 (such as an applications processor) depending on the desired output frequency. In some embodiments, a divider control input (e.g., N) may be determined from a look-up table based on a channel indicated by the application circuitry 702.

Synthesizer circuitry 706D of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 706D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. The FEM circuitry 708 may also include a transmit signal path which may include circuitry configured to amplify signals for transmission provided by the RF circuitry 706 for transmission by one or more of the one or more antennas 710. In various embodiments, the amplification through the transmit or receive signal paths may be done solely in the RF circuitry 706, solely in the FEM circuitry 708, or in both the RF circuitry 706 and the FEM circuitry 708.

In some embodiments, the FEM circuitry 708 may include a TX/RX switch to switch between transmit mode and receive mode operation. The FEM circuitry 708 may include a receive signal path and a transmit signal path. The receive signal path of the FEM circuitry 708 may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by the RF circuitry 706), and one or more filters to generate RF signals for subsequent transmission (e.g., by one or more of the one or more antennas 710).

In some embodiments, the PMC 712 may manage power provided to the baseband circuitry 704. In particular, the PMC 712 may control power-source selection, voltage scaling, battery charging, or DC-to-DC conversion. The PMC 712 may often be included when the device 700 is capable of being powered by a battery, for example, when the device 700 is included in a UE. The PMC 712 may increase the power conversion efficiency while providing desirable implementation size and heat dissipation characteristics.

FIG. 7 shows the PMC 712 coupled only with the baseband circuitry 704. However, in other embodiments, the PMC 712 may be additionally or alternatively coupled with, and perform similar power management operations for, other components such as, but not limited to, the application circuitry 702, the RF circuitry 706, or the FEM circuitry 708.

In some embodiments, the PMC 712 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used to execute Layer 3, Layer 2, or Layer 1 functionality, while processors of the application circuitry 702 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
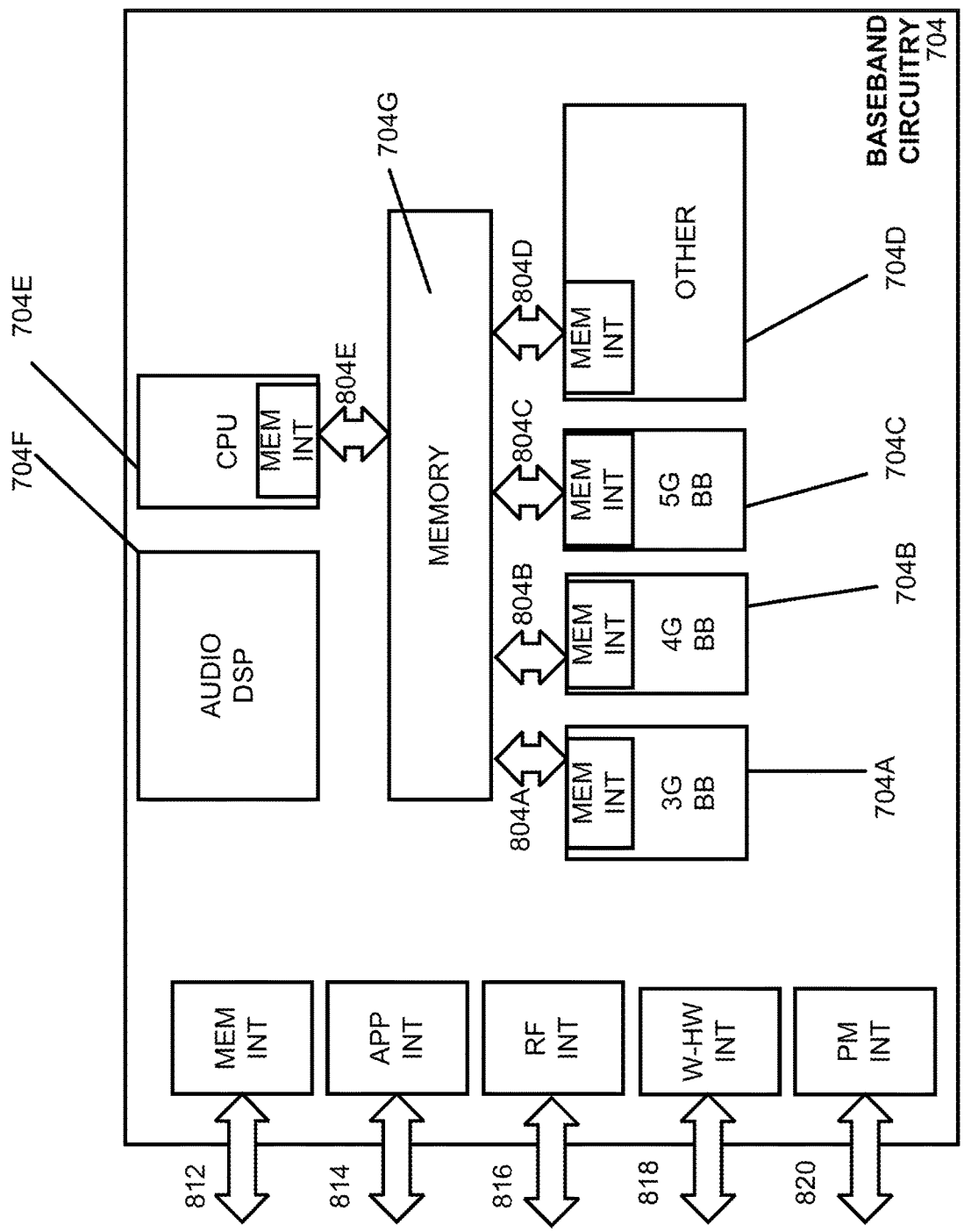
FIG. 8 illustrates example interfaces of baseband circuitry in accordance with some embodiments.

FIG. 8 illustrates example interfaces of baseband circuitry in accordance with some embodiments. As discussed above, the baseband circuitry 704 of FIG. 7 may comprise baseband processors 704A-604E and a memory 704G utilized by said processors. Each of the baseband processors 704A-604E may include a memory interface, 804A-704E, respectively, to send/receive data to/from the memory 704G.

The baseband circuitry 704 may further include one or more interfaces to communicatively couple to other circuitries/devices, such as a memory interface 812 (e.g., an interface to send/receive data to/from memory external to the baseband circuitry 704), an application circuitry interface 814 (e.g., an interface to send/receive data to/from the application circuitry 702 of FIG. 7), an RF circuitry interface 816 (e.g., an interface to send/receive data to/from RF circuitry 706 of FIG. 7), a wireless hardware connectivity interface 818 (e.g., an interface to send/receive data to/from Near Field Communication (NFC) components, Bluetooth® components (e.g., Bluetooth® Low Energy), Wi-Fi® components, and other communication components), and a power management interface 820 (e.g., an interface to send/receive power or control signals to/from the PMC 712.

Figure 9:
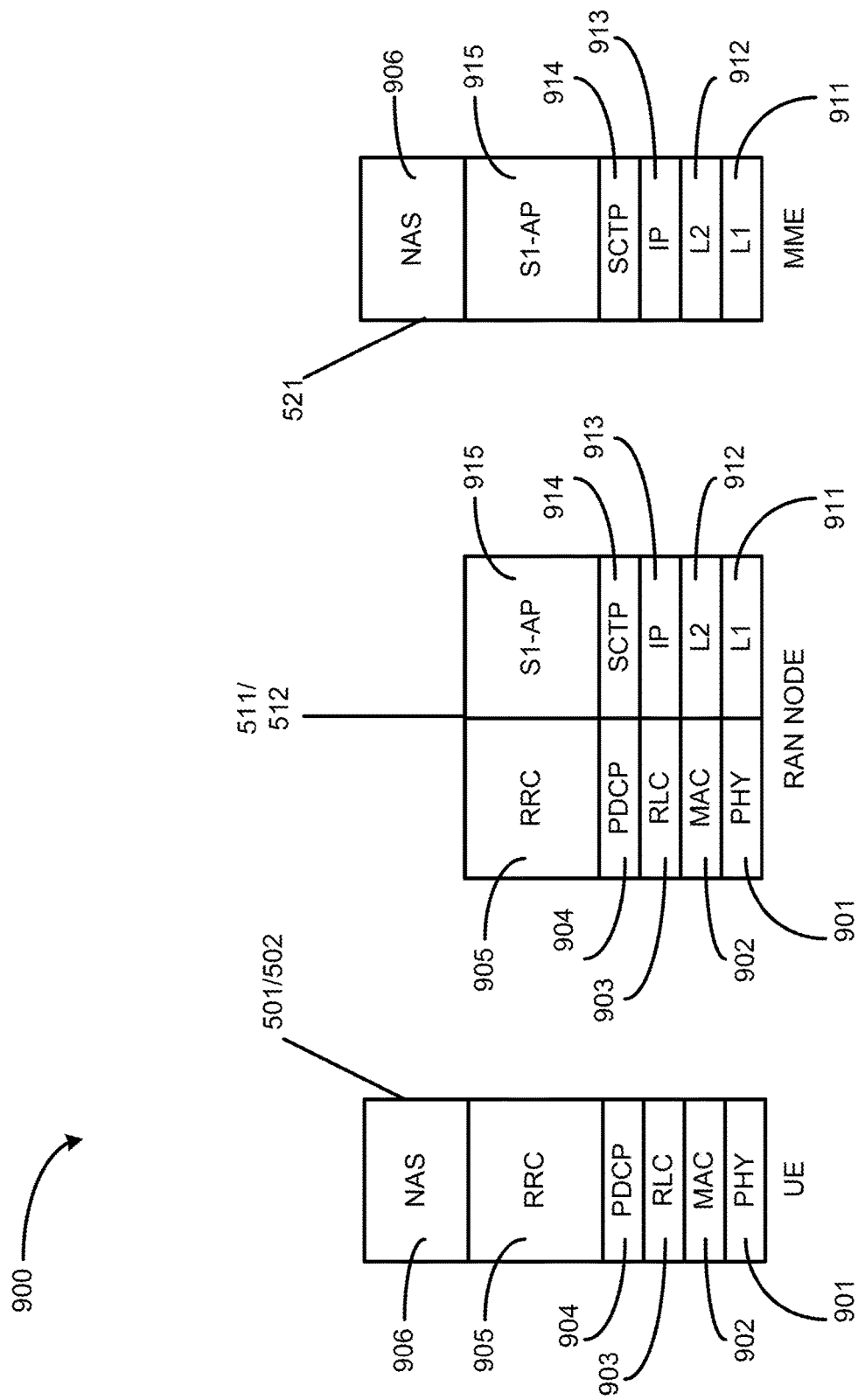
FIG. 9 is an illustration of a control plane protocol stack in accordance with some embodiments.

FIG. 9 is an illustration of a control plane protocol stack in accordance with some embodiments. In this embodiment, a control plane 900 is shown as a communications protocol stack between the UE 501 (or alternatively, the UE 502), the RAN node 511 (or alternatively, the RAN node 512), and the MME 521.

A PHY layer 901 may transmit or receive information used by the MAC layer 902 over one or more air interfaces. The PHY layer 901 may further perform link adaptation or adaptive modulation and coding (AMC), power control, cell search (e.g., for initial synchronization and handover purposes), and other measurements used by higher layers, such as an RRC layer 905. The PHY layer 901 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 902 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

An RLC layer 903 may operate in a plurality of modes of operation, including: Transparent Mode (TM), Unacknowledged Mode (UM), and Acknowledged Mode (AM). The RLC layer 903 may execute transfer of upper layer protocol data units (PDUs), error correction through automatic repeat request (ARQ) for AM data transfers, and concatenation, segmentation and reassembly of RLC SDUs for UM and AM data transfers. The RLC layer 903 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 904 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 905 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 501 and the RAN node 511 may utilize a Uu interface (e.g., an LTE-Uu interface) to exchange control plane data via a protocol stack comprising the PHY layer 901, the MAC layer 902, the RLC layer 903, the PDCP layer 904, and the RRC layer 905.

In the embodiment shown, the non-access stratum (NAS) protocols 906 form the highest stratum of the control plane between the UE 501 and the MME 521. The NAS protocols 906 support the mobility of the UE 501 and the session management procedures to establish and maintain IP connectivity between the UE 501 and the P-GW 523.

The S1 Application Protocol (S1-AP) layer 915 may support the functions of the S1 interface and comprise Elementary Procedures (EPs). An EP is a unit of interaction between the RAN node 511 and the CN 520. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the stream control transmission protocol/internet protocol (SCTP/IP) layer) 914 may ensure reliable delivery of signaling messages between the RAN node 511 and the MME 521 based, in part, on the IP protocol, supported by an IP layer 913. An L2 layer 912 and an L1 layer 911 may refer to communication links (e.g., wired or wireless) used by the RAN node and the MME to exchange information.

The RAN node 511 and the MME 521 may utilize an S1-MME interface to exchange control plane data via a protocol stack comprising the L1 layer 911, the L2 layer 912, the IP layer 913, the SCTP layer 914, and the S1-AP layer 915.

FIG. XXW is an illustration of a user plane protocol stack in accordance with some embodiments. In this embodiment, a user plane XXW00 is shown as a communications protocol stack between the UE 501 (or alternatively, the UE 502), the RAN node 511 (or alternatively, the RAN node 512), the S-GW 522, and the P-GW 523. The user plane XXW00 may utilize at least some of the same protocol layers as the control plane 900. For example, the UE 501 and the RAN node 511 may utilize a Uu interface (e.g., an LTE-Uu interface) to exchange user plane data via a protocol stack comprising the PHY layer 901, the MAC layer 902, the RLC layer 903, the PDCP layer 904.

The General Packet Radio Service (GPRS) Tunneling Protocol for the user plane (GTP-U) layer 1004 may be used for carrying user data within the GPRS core network and between the radio access network and the core network. The user data transported can be packets in any of IPv4, IPv6, or PPP formats, for example. The UDP and IP security (UDP/IP) layer 1003 may provide checksums for data integrity, port numbers for addressing different functions at the source and destination, and encryption and authentication on the selected data flows. The RAN node 511 and the S-GW 522 may utilize an S1-U interface to exchange user plane data via a protocol stack comprising the L1 layer 911, the L2 layer 912, the UDP/IP layer 1003, and the GTP-U layer 1004. The S-GW 522 and the P-GW 523 may utilize an S5/S8a interface to exchange user plane data via a protocol stack comprising the L1 layer 911, the L2 layer 912, the UDP/IP layer 1003, and the GTP-U layer 1004. As discussed above with respect to FIG. 9, NAS protocols support the mobility of the UE 501 and the session management procedures to establish and maintain IP connectivity between the UE 501 and the P-GW 523.

Figure 10:
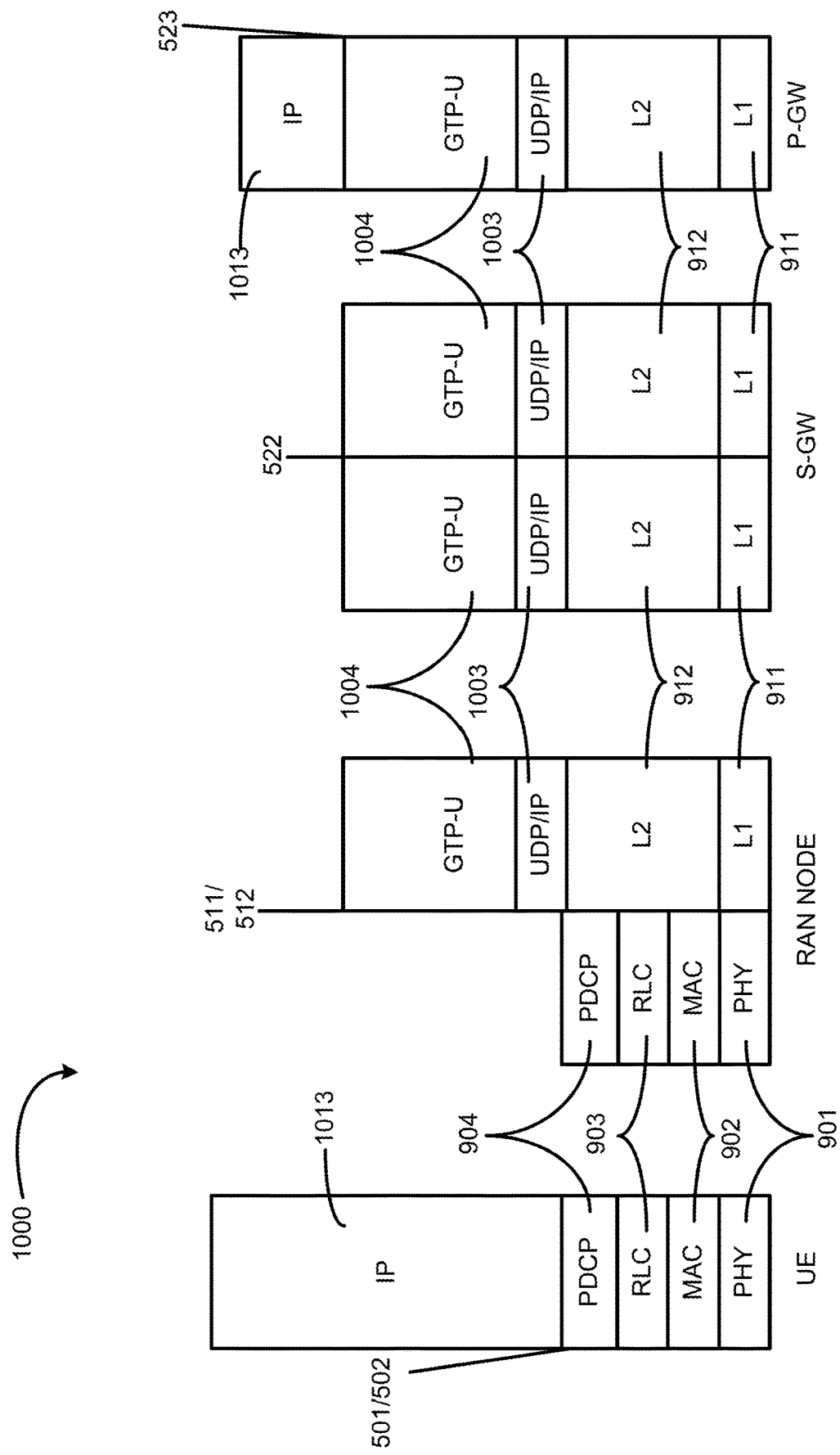
FIG. 10 is an illustration of a user plane protocol stack in accordance with some embodiments.

FIG. 10 is an illustration of a user plane protocol stack in accordance with some embodiments. In this embodiment, a user plane 1000 is shown as a communications protocol stack between the UE 501 (or alternatively, the UE 502), the RAN node 511 (or alternatively, the RAN node 512), the S-GW 522, and the P-GW 523. The user plane 1000 may utilize at least some of the same protocol layers as the control plane 900. For example, the UE 501 and the RAN node 511 may utilize a Uu interface (e.g., an LTE-Uu interface) to exchange user plane data via a protocol stack comprising the PHY layer 901, the MAC layer 902, the RLC layer 903, the PDCP layer 904.

The General Packet Radio Service (GPRS) Tunneling Protocol for the user plane (GTP-U) layer 1004 may be used for carrying user data within the GPRS core network and between the radio access network and the core network. The user data transported can be packets in any of IPv4, IPv6, or PPP formats, for example. The UDP and IP security (UDP/IP) layer 1003 may provide checksums for data integrity, port numbers for addressing different functions at the source and destination, and encryption and authentication on the selected data flows. The RAN node 511 and the S-GW 522 may utilize an S1-U interface to exchange user plane data via a protocol stack comprising the L1 layer 911, the L2 layer 912, the UDP/IP layer 1003, and the GTP-U layer 1004. The S-GW 522 and the P-GW 523 may utilize an S5/S8a interface to exchange user plane data via a protocol stack comprising the L1 layer 911, the L2 layer 912, the UDP/IP layer 1003, and the GTP-U layer 1004. As discussed above with respect to FIG. 9, NAS protocols support the mobility of the UE 501 and the session management procedures to establish and maintain IP connectivity between the UE 501 and the P-GW 523.

Figure 11:
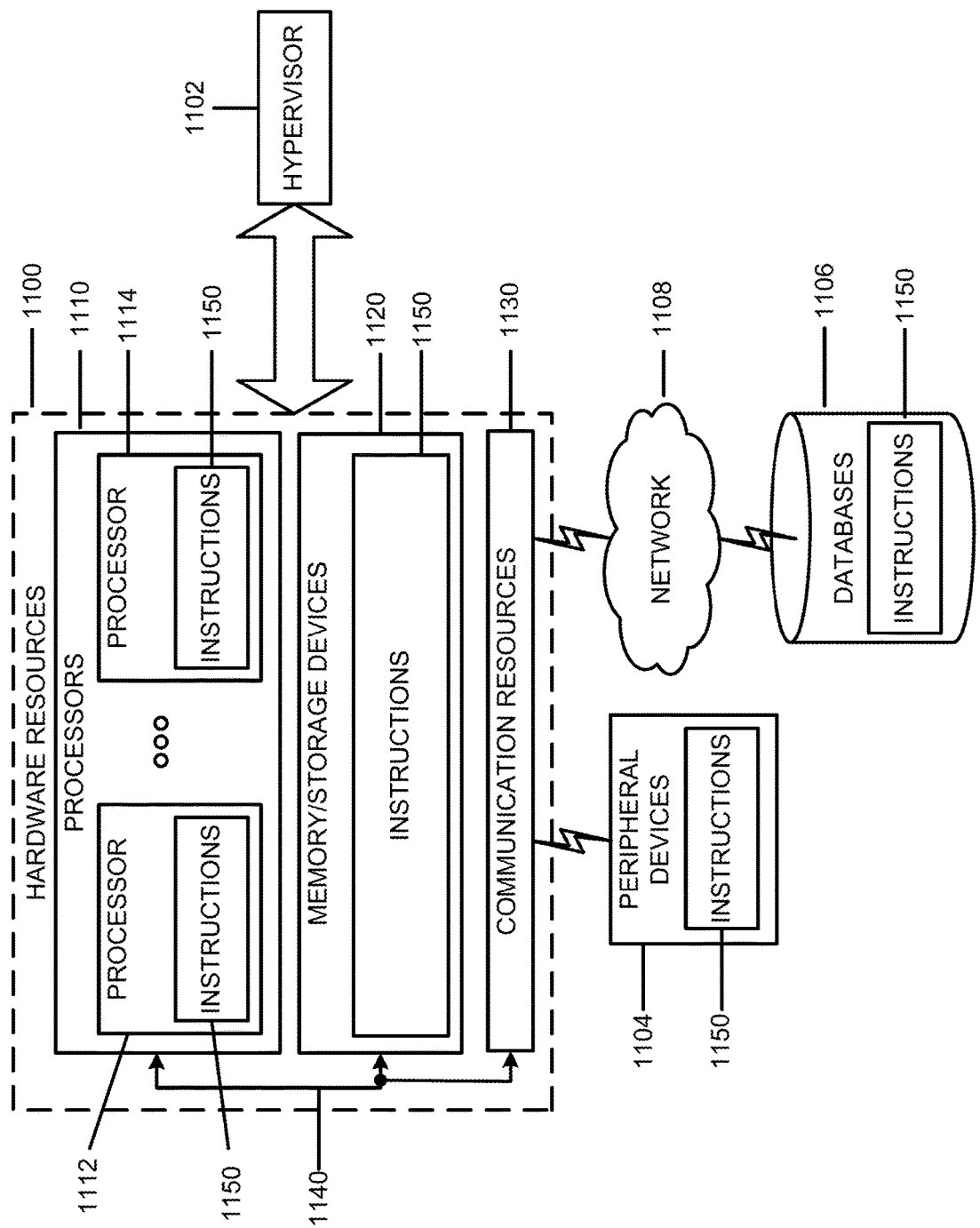
FIG. 11 is a block diagram illustrating components, according to some example embodiments, able to read instructions from a machine-readable or computer-readable medium (e.g., a non-transitory machine-readable storage medium) and perform any one or more of the methodologies discussed herein.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. For embodiments where node virtualization (e.g., NFV) is utilized, a hypervisor 1102 may be executed to provide an execution environment for one or more network slices/sub-slices to utilize the hardware resources 1100.

The processors 1110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1112 and a processor 1114.

The memory/storage devices 1120 may include main memory, disk storage, or any suitable combination thereof. The memory/storage devices 1120 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

EXAMPLES

Example 1A may include a method where the sameSFN-Indication is provided in the MobilityControlInfo message only if the scheduling information of SIB1-BR is same in both the source cell and the target cell during the handover.

Example 2A may include a method where a separate scheduling information of SIB1-BR (schedulingInfoSIB1-BR-r14) is provided together with sameSFN-Indication is provided in the MobilityControlInfo message.

Example 3A may include a method where an offset value to schedulingInfoSIB1-BR index is provided to indicate the change in the scheduling information of SIB1-BR.

Example 4A may include a method where an indication MobilityControlInfo is signaled in the message to indicate whether or not the scheduling information of SIB1-BR is changed in the target cell.

Example 5A may include a method where the change indication of scheduling information of the SIB1-BR is signaled together with indication of the optional MIB repetitions of the target cell.

Example 6A may include a method of example 5A where an indication field in the MobilityControlInfo message indicates that the MIB repetition is enabled and scheduling information of SIB1-BR has not changed in the target cell.

Example 7A may include a method where UE may either handle or avoid the collision blindly or decide to acquire the MIB if the sameSFN-Indication in mobilityControlInfo message is provided.

Example 8A may include an apparatus comprising means to perform one or more elements of a method described in or related to any of examples 1A-7A, or any other method or process described herein.

Example 9A may include one or more non-transitory computer-readable media comprising instructions to cause an electronic device, upon execution of the instructions by one or more processors of the electronic device, to perform one or more elements of a method described in or related to any of examples 1A-7A, or any other method or process described herein.

Example 10A may include an apparatus comprising logic, modules, or circuitry to perform one or more elements of a method described in or related to any of examples 1A-7A, or any other method or process described herein.

Example 11A may include a method, technique, or process as described in or related to any of examples 1A-7A, or portions or parts thereof.

Example 12A may include an apparatus comprising: one or more processors and one or more computer readable media comprising instructions that, when executed by the one or more processors, cause the one or more processors to perform the method, techniques, or process as described in or related to any of examples 1A-7A, or portions thereof.

Example 13A may include a device having circuitry to generate a MobilityControlInfo message having a sameSFN-Indication if scheduling information of SIB1-BR is same in both a source cell and a target cell during a handover.

Example 14A may include a device having circuitry to generate a MobilityControlInfo message having a separate a separate scheduling information of SIB1-BR (schedulingInfoSIB1-BR-r14) provided together with sameSFN-Indication.

Example 15A may include a signal as described in or related to any of examples 1A-14A, or portions or parts thereof.

Example 16A may include a signal in a wireless network as shown and described herein.

Example 17A may include a method of communicating in a wireless network as shown and described herein.

Example 18A may include a system for providing wireless communication as shown and described herein.

Example 19A may include a device for providing wireless communication as shown and described herein.

The following additional examples pertain to further embodiments.

Example 1 is an apparatus for a user equipment (UE), comprising: a memory interface to send or receive, to or from a memory device, a radio resource control (RRC) connection reconfiguration message from a source cell in a wireless network; and a baseband processing circuitry to: identify a scheduling information field in the RRC connection reconfiguration message that indicates system information block type1-bandwidth reduced (SIB1-BR) scheduling information for a target cell; determine scheduling of an SIB1-BR for the target cell based on the scheduling information field; receive a SIB1-BR from the target cell during the determined scheduling; and process the SIB1-BR.

Example 2 is the apparatus of example 1, wherein the scheduling information field is provided within a mobility control information element.

Example 3 is the apparatus of example 1, wherein the scheduling information field comprises an index to a table that defines SIB1-BR scheduling.

Example 4 is the apparatus of example 3, wherein the table defines resource allocation for the SIB1-BR from the target cell.

Example 5 is the apparatus of example 1, wherein the baseband processing circuitry is further to acquire a master information block (MIB) if a same system frame number indication (sameSFN-Indication) in a mobility control information element message is provided.

Example 6 is the apparatus of example 1, wherein an MIB is not used to determine scheduling of the SIB1-BR for the target cell.

Example 7 the is the apparatus of example 1, wherein the baseband processing circuitry is further to determine a physical downlink shared channel (PDSCH) carrying the SIB1-BR based on the scheduling information field.

Example 8 is the apparatus of example 7, wherein the baseband processing circuitry is further to avoid collisions between the PDSCH carrying the SIB1-BR and another PDSCH.

Example 9 is a machine readable storage medium including machine-readable instructions, when executed by one or more processors of a base station, to: generate a mobility control information element for a radio resource control (RRC) connection reconfiguration message; insert a variable into a scheduling information field within the mobility control information element to indicate system information block type1-bandwidth reduced (SIB1-BR) scheduling information for a target cell; and provide the mobility control information element with the scheduling information field to a user equipment (UE) via the RRC connection reconfiguration message.

Example 10 is the machine readable storage medium of example 9, wherein the scheduling information field comprises an index to a table that defines the SIB1-BR scheduling information.

Example 11 is the machine readable storage medium of example 10, wherein the table defines resource allocation for a SIB1-BR from the target cell.

Example 12 is the machine readable storage medium of example 9, wherein a master information block (MIB) is not used to indicate scheduling of SIB1-BR for the target cell.

Example 13 is the machine readable storage medium of example 9, wherein the scheduling information field defines resources allocated for a physical downlink shared channel (PDSCH) carrying a SIB1-BR.

Example 14 is the machine readable storage medium of example 9, wherein the scheduling information field provides information to a UE to avoid collisions between a PDSCH carrying the SIB1-BR and another PDSCH.

Example 15 is a machine readable storage medium including machine-readable instructions, when executed by one or more processors of a user equipment (UE), to: decode a radio resource control (RRC) connection reconfiguration message from a source cell in a wireless network; determine an index value associated with a scheduling information system information block type1-bandwidth reduced variable (schedulingInfoSIB1-BR) within the RRC connection reconfiguration message; identify system information block type1-bandwidth reduced (SIB1-BR) scheduling information for a target cell using the index value; and configure the UE to receive a PDSCH from the target cell carrying a SIB1-BR based on the SIB1-BR scheduling information.

Example 16 is the machine readable storage medium of example 15, wherein an master information block (MIB) is not used to identify the SIB1-BR scheduling information for the target cell.

Example 17 is the machine readable storage medium of example 15, wherein the index value ranges between 0 and 31.

Example 18 is the machine readable storage medium of example 15, further to identify a field within the RRC connection reconfiguration message that indicates that the target cell has a same system frame number (SFN) as the source cell.

Example 19 is the machine readable storage medium of example 18, wherein the UE is not required to acquire a MIB in the target Cell during handover to obtain the SFN of the target cell.

Example 20 is the machine readable storage medium of example 15, wherein the index value indicates whether SIB1-BR scheduling information for the target cell is different from the source cell.

It will be obvious to those having skill in the art that many changes may be made to the details of the above-described embodiments without departing from the underlying principles of the invention. The scope of the present invention should, therefore, be determined only by the following claims.

The invention claimed is:

1. An apparatus for a user equipment (UE), comprising:
a memory interface to send or receive, to or from a memory device, a radio resource control (RRC) connection reconfiguration message from a source cell in a wireless network; and
a baseband processing circuitry to:
identify a scheduling information field in the RRC connection reconfiguration message that indicates system information block type 1-bandwidth reduced (SIB1-BR) scheduling information for a target cell, wherein the RRC connection reconfiguration message comprises a mobility control information element, and wherein the scheduling information field that indicates the SIB1-BR scheduling information for a target cell is provided within the mobility control information element;
determine scheduling of an SIB1-BR for the target cell based on the scheduling information field in the RRC connection reconfiguration message;
receive a SIB1-BR from the target cell during the determined scheduling; and
process the SIB1-BR.

2. The apparatus of claim 1, wherein the scheduling information field comprises an index to a table that defines SIB1-BR scheduling.

3. The apparatus of claim 2, wherein the table defines resource allocation for the SIB1-BR from the target cell.

4. The apparatus of claim 1, wherein the baseband processing circuitry is further to acquire a master information block (MIB) when a same system frame number indication (same SFN-Indication) in the mobility control information element message is provided.

5. The apparatus of claim 1, wherein a master information block (MIB) is not used to determine scheduling of the SIB1-BR for the target cell.

6. The apparatus of claim 1, wherein the processing circuitry is further to determine a physical downlink shared channel (PDSCH) carrying the SIB1-BR based on the scheduling information field.

7. The apparatus of claim 6, wherein the baseband processing circuitry is further to avoid collisions between the PDSCH carrying the SIB1-BR and another PDSCH.

8. A non-transitory machine readable storage medium including machine-readable instructions, when executed by one or more processors of a base station, to:
generate a mobility control information element for a radio resource control (RRC) connection reconfiguration message, wherein the RRC connection reconfiguration message includes the mobility control information element, and wherein the mobility control information element comprises a scheduling information field that indicates system information block type1-bandwidth reduced (SIB1-BR) scheduling information for a target cell;
insert a variable into the scheduling information field within the mobility control information element to indicate the SIB1-BR scheduling information for a target cell; and
provide the mobility control information element with the scheduling information field indicating the SIB1-BR scheduling information to a user equipment (UE) via the RRC connection reconfiguration message.

9. The non-transitory machine readable storage medium of claim 8, wherein the scheduling information field comprises an index to a table that defines the SIB1-BR scheduling information.

10. The non-transitory machine readable storage medium of claim 9, wherein the table defines resource allocation for a SIB1-BR from the target cell.

11. The non-transitory machine readable storage medium of claim 8, wherein a master information block (MIB) is not used to indicate scheduling of SIB1-BR for the target cell.

12. The non-transitory machine readable storage medium of claim 8, wherein the scheduling information field defines resources allocated for a physical downlink shared channel (PDSCH) carrying a SIB1-BR.

13. The non-transitory machine readable storage medium of claim 8, wherein the scheduling information field provides information to a UE to avoid collisions between a physical downlink shared channel (PDSCH) carrying the SIB1-BR and another PDSCH.

14. A non-transitory machine readable storage medium including machine-readable instructions, when executed by one or more processors of a user equipment (UE), to:
   decode a radio resource control (RRC) connection reconfiguration message from a source cell in a wireless network, wherein the RRC connection reconfiguration message comprises a mobility control information element, and wherein the mobility control information element comprises a scheduling information system information block type1-bandwidth reduced variable (schedulingInfoSIB1-BR) for a target cell;
   determine an index value associated with the schedulingInfoSIB1-BR within the RRC connection reconfiguration message;
   identify system information block type 1-bandwidth reduced (SIB1-BR) scheduling information for a target cell using the index value from the schedulingInfoSIB1-BR within the RRC connection reconfiguration message; and
   configure the UE to receive a physical downlink shared channel (PDSCH) from the target cell carrying a SIB1-BR based on the SIB1-BR scheduling information.

15. The non-transitory machine readable storage medium of claim 14, wherein an master information block (MIB) is not used to identify the SIB1-BR scheduling information for the target cell.

16. The non-transitory machine readable storage medium of claim 14, wherein the index value ranges between 0 and 31.

17. The non-transitory machine readable storage medium of claim 14, further to identify a field within the RRC connection reconfiguration message that indicates that the target cell has a same system frame number (SFN) as the source cell.

18. The non-transitory machine readable storage medium of claim 17, wherein the UE is not required to acquire a master information block (MIB) in the target Cell during handover to obtain the SFN of the target cell.

19. The non-transitory machine readable storage medium of claim 14, wherein the index value indicates whether SIB1-BR scheduling information for the target cell is different from the source cell.

\* \* \* \* \*